(12) United States Patent
Akada et al.

(10) Patent No.: US 7,968,632 B2
(45) Date of Patent: Jun. 28, 2011

(54) POLYCARBONATE RESIN COMPOSITION AND PROCESS FOR PRODUCING THEREOF

(75) Inventors: Masayuki Akada, Hiratsuka (JP); Seiichi Takada, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 11/921,750

(22) PCT Filed: Jun. 5, 2006

(86) PCT No.: PCT/JP2006/311210
§ 371 (c)(1), (2), (4) Date: Mar. 2, 2009

(87) PCT Pub. No.: WO2006/134797
PCT Pub. Date: Dec. 21, 2006

(65) Prior Publication Data
US 2009/0186967 A1    Jul. 23, 2009

(30) Foreign Application Priority Data
Jun. 15, 2005    (JP) ................................. 2005-175250

(51) Int. Cl.
*C08K 5/42* (2006.01)
*C08K 5/5398* (2006.01)
(52) U.S. Cl. .................. 524/146; 524/157; 524/158
(58) Field of Classification Search .................. 524/146, 524/157, 158
See application file for complete search history.

(56) References Cited

U.S. PATENT DOCUMENTS

| 4,443,657 | A | * | 4/1984 | Hill et al. | 174/110 FC |
| 5,033,652 | A | * | 7/1991 | Kay et al. | 222/153.13 |
| 5,169,885 | A | * | 12/1992 | Hanayama et al. | 524/152 |
| 6,441,071 | B1 | * | 8/2002 | Van Nuffel | 524/316 |
| 6,994,908 | B1 | * | 2/2006 | Ishiwari et al. | 428/422 |

FOREIGN PATENT DOCUMENTS

| JP | 63-128060 | 5/1988 |
| JP | 07-207138 | 8/1995 |
| JP | 09-12859 | 1/1997 |
| JP | 09-194711 | 7/1997 |
| JP | 09 194711 A | 7/1997 |
| JP | 10-237293 | 9/1998 |
| JP | 2003-26911 | 1/2003 |

OTHER PUBLICATIONS

International Search Report mailed Jul. 11, 2006.

* cited by examiner

*Primary Examiner* — Peter Szekely
(74) *Attorney, Agent, or Firm* — Nixon & Vanderhye P.C.

(57) ABSTRACT

There is provided an antistatic polycarbonate resin composition and molded product formed by melt-molding the said resin composition, which resin composition has totally well balanced excellent properties including heat resistance, in which yellow- or brown-coloring can be prevented even though under melt-kneading step, molding step and such a circumstance that it is used at high temperature for long times, and the fluidity is improved without notably deterioration of mechanical strengths and transparency.

A polycarbonate resin composition comprising 100 parts by weight of polycarbonate resin, 0.1 to 5.0 parts by weight of phosphonium sulfonate (A) represented by the following chemical formula (1), 0.1 to 10 parts by weight of aromatic polycarbonate resin oligomer (B) and 0.01 to 8 parts by weight of caprolactone-based polymer (C); and a molded product produced by melt-molding the said polycarbonate resin.

6 Claims, No Drawings

POLYCARBONATE RESIN COMPOSITION AND PROCESS FOR PRODUCING THEREOF

This application is the U.S. national phase of International Application No. PCT/JP2006/311210 filed 5 Jun. 2006 which designated the U.S. and claims priority to JP 2005-175250 filed 15 Jun. 2005, the entire contents of each of which are hereby incorporated by reference in their entirety.

TECHNICAL FIELD

The present invention relates to a antistatic-polycarbonate resin composition, and more particularly it relates to a polycarbonate resin composition having totally well balanced excellent properties and molding products formed by melt-molding the said resin composition.

BACKGROUND ART

Since polycarbonate resins are excellent in mechanical strength, heat resistance, transparency or the like, the resins are widely used in fields of materials of electronic/electric/OA equipments, automobile parts, construction materials, medical appliances, sundry articles or the like. However, since polycarbonate resins has a high surface resistance value, it is difficult to eliminate the static charge generated by contact and friction. Therefore, polycarbonate resins have such problems that waste and dust are attached on the surface of molded product to deteriorate the appearance and transparency, electric shock causes discomfort of human body, noise generates and improper operating signals for a machine are produced. From these, it is demanded to provide a polycarbonate resin composition and molding products formed by melt-molding the said resin composition which have antistatic property by reducing the surface resistance value of polycarbonate resin without deterioration of polycarbonate resin properties in nature.

Generally, as the polycarbonate resin composition having antistatic property, there has been proposed a resin composition comprising polycarbonate resin, phosphonium sulfonate, phosphite and caprolactone-based polymer which are blended (refer to Japanese Patent Application Laid-open (KOKAI) No. H09-194711). However, the said resin composition has such problems that fluidity variation is large so that stable molding is difficult, yellow or brown coloring generates during the melt-kneading step and molding step, and the mechanical strength and antistatic property are deteriorated. It is thought that these problems are caused by high melt viscosity of polycarbonate resin so that the melt-kneading temperature and melt-molding temperature rise and the thermal decomposition of resin notably generates.

There have been also proposed a polycarbonate resin molded product for optical use comprising a polycarbonate resin and 1 to 60% by weight of polycarbonate oligomer blended (refer to Japanese Patent Application Laid-open (KOKAI) No. S61-123658), and a resin comprising a polycarbonate resin and 10% by weight or more of polycarbonate oligomer having a molecular weight of 2000 to 5000 (refer to Japanese Patent Application Laid-open (KOKAI) No. H09-208684). However, these proposals only suggest that the fluidity is affected by blending oligomer when using the molding products for optical arts.

In the above prior arts, when the fluidity of resin composition having antistatic property is improved, the color hue and mechanical strengths tend to deteriorate notably. Therefore, it is desired to provide an antistatic polycarbonate resin composition and molded product formed by melt-molding the said resin composition, which resin composition has totally well balanced excellent properties including heat resistance, in which yellow- or brown-coloring can be prevented even though under melt-kneading step, molding step and such a circumstance that it is used at high temperature for long times, and the fluidity is improved without notably deterioration of mechanical strengths and transparency.

DISCLOSURE OF THE INVENTION

Problem to be Solved by the Invention

An object of the present invention is to provide an antistatic polycarbonate resin composition and molded product formed by melt-molding the said resin composition, which resin composition has totally well balanced excellent properties including heat resistance, in which yellow- or brown-coloring can be prevented even though under melt-kneading step, molding step and such a circumstance that it is used at high temperature for long times, and the fluidity is improved without notably deterioration of mechanical strengths and transparency.

Means for Solving the Problem

As the result of present inventors' earnest studies, it has been found that by blending an aromatic polycarbonate resin oligomer (B) and caprolactone-based polymer (C) into a resin composition comprising a polycarbonate resin and phosphonium sulfonate (A) blended in each specific amount, a molded product having well balanced excellent properties, in which coloring (change of color hue) can be prevented in the melt-kneading step and molding step, and the fluidity can be improved without deterioration of mechanical strengths and transparency. The present invention has been attained on the basis of the above finding.

Especially, in consideration of heat resistance, it is unexpected finding to control the blending amount of caprolactone-based polymer to the specific amount or less.

Thus, in aspects of the present invention, there is provided a polycarbonate resin composition comprising 100 parts by weight of polycarbonate resin, 0.1 to 5.0 parts by weight of phosphonium sulfonate (A) represented by the following chemical formula (1), 0.1 to 10 parts by weight of aromatic polycarbonate resin oligomer (B) and 0.01 to 8 parts by weight of caprolactone-based polymer (C).

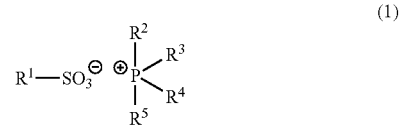

(1)

(where in the chemical formula (1), $R^1$ is an alkyl group or aryl group having a carbon number of 1 to 40, which may have substituent group(s) and $R^2$ to $R^5$ are independently hydrogen atom, or an alkyl group or aryl group having a carbon number of 1 to 10 wherein each $R^2$ to $R^5$ may be same group or different group); and a molded product produced by melt-molding the said polycarbonate resin.

EFFECT OF THE INVENTION

According to the present invention, there can be obtained an antistatic polycarbonate resin composition and molded product formed by melt-molding the said resin composition, which resin composition has totally well balanced excellent properties including heat resistance, in which yellow- or brown-coloring can be prevented even though under melt-kneading step, molding step and such a circumstance that it is used at high temperature for long times, and the fluidity is improved without notably deterioration of mechanical strengths and transparency.

PREFERRED EMBODIMENTS FOR CARRYING OUT THE INVENTION

The present invention is described in detail below.

Polycarbonate Resin:

As the polycarbonate resin used in the present invention, there can be used an aromatic polycarbonate, aliphatic polycarbonate, aromatic-aliphatic polycarbonate or the like. Of these, an aromatic polycarbonate is preferred. The aromatic polycarbonate is a resin obtained by interfacial polymerization comprising reacting an aromatic hydroxyl compound or an aromatic hydroxyl compound and a small amount of polyhydroxyl with phosgene compound (phosgene method), or melting method comprising reacting an aromatic hydroxyl compound or an aromatic hydroxyl compound and a small amount of polyhydroxyl with diester carbonate (ester exchange method). The obtained polymer is a linear or branched thermoplastic polymer or copolymer. Further, the aromatic polycarbonate resin is a resin produced by melting method, whose amount of end OH group has been controlled.

As the aromatic dihydroxyl compound, there are exemplified 2,2-bis(4-hydroxyphenyl)propane (=bisphenol A), tetramethyl bisphenol A, (4-hydroxyphenyl)-P-diisopropyl benzene, hydroquinone, resorcinol, 4,4-dihydroxydiphenyl or the like. Of these, bisphenol A is preferred. Further, for the purpose of enhancing flame retardancy further, there may be used a polymer or oligomer in which one or more tetraalkyl phosphonium sulfonate is bonded to the above aromatic dihydroxyl compound and/or a polymer or oligomer having siloxane structure and phenolic hydroxyl groups at the both end groups.

In order to obtain a branched aromatic polycarbonate resin, a part of the above aromatic dihydroxyl compound is replaced the following compound: a polyhydroxyl compound such as phloroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,1,3,5-tri (4-hydroxyphenyl)benzene and 1,1,1-tri(4-hydroxyphenyl) ethane, 3,3-bis(4-hydroxyaryl), oxyindole (=isatin bisphenol), 5-chloro isatin bisphenol, 5,7-dichloroisatin bisphenol, 5-bromoisatin bisphenol, or the like. The amount of these compounds used is 0.01 to 10 mol %, preferably 0.1 to 2 mol % based on the aromatic dihydroxyl compound.

In order to control the molecular weight of polycarbonate resin, mono-equivalent aromatic hydroxyl compound can be used. Examples of mono-equivalent aromatic hydroxyl compound may include m- and p-methylphenol, m- and p-propylphenol, p-tert-butylphenol, p-long chain alkyl group substituted phenol, or the like.

The preferred polycarbonate resins used in the present invention are polycarbonate resins derived from bisphenol A and aromatic polycarbonate copolymers derived from bisphenol A and bisphenol A and the other aromatic dihydroxyl compound. Further, two or more resins may be used in mixture as the polycarbonate resin used in the present invention.

The viscosity average molecular weight of polycarbonate resin which is an equivalent measured in methylene chloride as a solvent at 25° C. is preferable 13000 to 40000, more preferably 14000 to 30000, especially preferably 15000, 29000. When the viscosity average molecular weight is less than 13000, the mechanical strength such as the impact strength may be insufficient. When the viscosity average molecular weight is more than 40000, the fluidity may be reduced.

Phosphonium Sulfonate (A):

The phosphonium sulfonate (A) used in the present invention is used for the purpose of imparting antistatic property and is represented by the following chemical formula (1):

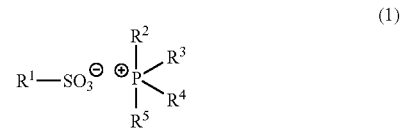

(1)

Where in the chemical formula (1), $R^1$ is an alkyl group or aryl group having a carbon number of 1 to 40, which may have substituent group(s) and $R^2$ to $R^5$ are independently hydrogen atom, or an alkyl group or aryl group having a carbon number of 1 to 10 wherein each $R^2$ to $R^5$ may be same group or different group.

The phosphonium sulfonate (A) represented by the above chemical formula (1) is blended to the polycarbonate resin in an amount of 0.1 to 5.0 parts by weight, preferably 0.5 to 4.5 parts by weight, more preferably 1.0 to 4.0 parts by weight, especially preferably 1.5 to 3.5 parts by weight based on 100 parts by weight of polycarbonate resin. When the blending amount of phosphonium sulfonate (A) is less than 0.1 parts by weight, sufficient antistatic effect may not be attained. When the blending amount of phosphonium sulfonate (A) is more than 5.0 parts by weight, the transparency and mechanical strength may be deteriorated and silver streak and peeling off phenomenon may occur at the surface of molded product so that these may cause appearance deterioration.

In the above chemical formula (1), $R^1$ is an alkyl group or aryl group having a carbon number 1 to 40. In view of transparency, heat resistance and compatibility to the polycarbonate resin, an aryl group is preferred. Further, an alkylbenzene or alkylnaphthalene substituted with an alkyl group having a carbon number of 1 to 34, preferably 5 to 20, more preferably 10 to 15 is more preferred. In the above chemical formula (1), $R^2$ to $R^5$ are independently an alkyl group or aryl group having a carbon number 1 to 10. Preferred is an alkyl group having a carbon number of 2 to 8, more preferably an alkyl group having a carbon number of 3 to 6, especially preferably butyl group.

Examples of the phosphonium sulfonate (A) according to the present invention may include tetrabutyl phosphonium dodecylsulfonate, tetrabutyl phosphonium dodecylnebenzene sulfonate, trioctyl phosphonium dodecylnebenzene sulfonate, tetraoctyl phosphonium dodecylnebenzene sulfonate, tetraethyl phosphonium octadecylbenzene sulfonate, tetraethyl phosphonium dibutylbenzene sulfonate, tributylmethyl phosphonium dibutylbenzene sulfonate, triphenyl phosphonium dinaphthyl sulfonate, trioctylmethyl phosphonium diisopropylnaphthyl sulfonate, or the like. Of these, tetrabutyl phosphonium dodecylnebenzene sulfonate is preferred in view of good compatibility to polycarbonate resin and easy availability.

Aromatic Polycarbonate Oligomer (B)

The polycarbonate resin composition according to the present invention is characterized in that the aromatic polycarbonate oligomer (B) is contained in a specific amount in addition to the phosphonium sulfonate (A). By this blending, it can be attained to obtain a molded product having totally balanced good properties such as transparency, coloring during the melt-kneading step and molding step, fluidity, heat resistance, mechanical strength and antistatic property.

In the present invention, the aromatic polycarbonate oligomer (B) means an oligomer having a viscosity average molecular weight of 1000 to 10000. In view of attaining the improving effect of fluidity while maintaining the balance for the other properties such as impact resistance and transparency, the viscosity average molecular weight thereof is preferably 1500 to 9000, more preferably 2000 to 8000. When the viscosity average molecular weight of oligomer is less than 1000, the oligomer may be easily bled out from the molding product at the molding step. When the viscosity average molecular weight of oligomer is more than 10000, the fluidity may be deteriorated.

The number average polymerization degree (average of number of repeating unit) of aromatic polycarbonate oligomer (B) is usually 2 to 15, preferably 3 to 4, more preferably 4 to 13. When the number average polymerization degree thereof is 1, the oligomer may be easily bled out from the molding product at the molding step. When the number average polymerization degree thereof is more than 15, the fluidity may be deteriorated.

The aromatic polycarbonate oligomer (B) can be produced by reacting the aromatic dihydroxyl compound with phosgene or diester carbonate in the presence of molecular weight controlling agent. As the aromatic dihydroxyl compound, the above mentioned aromatic dihydroxyl compound for the material of aromatic polycarbonate resin mat be used, and bisphenol A is preferably used. As the molecular weight controlling agent, there may be used the above mentioned mono-equivalent aromatic hydroxyl compound used for controlling the molecular weight of aromatic polycarbonate resin, such as m- and p-methylphenol, m-and p-propylphenol, p-tert-butylphenol, p-long chain alkyl group substituted phenol, or the like.

As the aromatic polycarbonate oligomer (B), there may be used an oligomer obtained by copolymerizaion using two or more aromatic hydroxyl compounds. As the combination of aromatic hydroxyl compounds, there may be exemplified bisphenol A (BPA) and tetrabromobisphenol A (TBA).

The blending amount of aromatic polycarbonate oligomer (B) is 0.1 to 10 parts by weight, preferably 0.3 to 5 parts by weight, more preferably 0.5 to 3 parts by weight based on 100 parts by weight of polycarbonate resin. When the blending amount of aromatic polycarbonate oligomer (B) is less than 0.1 parts by weight, the improving effect of fluidity may be insufficient. When the blending amount of aromatic polycarbonate oligomer (B) is more than 10 parts by weight, the color hue after the thermal aging treatment may be deteriorated and the impact strength may be reduced.

Further, in order to attain the improving effect of fluidity, the blending ratio of aromatic polycarbonate oligomer (B) to the phosphonium sulfonate (A) represented by the chemical formula (1) ((B)/(A), weight ratio) is usually 2/100 to 2000/100, preferably 5/100 to 500/100, more preferably 10/100 to 200/100.

Caprolactone-based Polymer (C):

In the resin composition according to the present invention, it is featured to further blend the caprolactone-based polymer (C) in a specific amount. The caprolactone-based polymer (C) in the present invention is a polymer or copolymer having a constitutional unit derived from ε-caprolactone in an amount of not less than 70% by weight, preferably 75% by weight, more preferably 80% by weight in a molecule. As the monomer coplymerizable with from ε-caprolactone, there may be exemplified lactone monomers such as β-propiolactone, pivalolactone and butylolactone, alkylene oxides such as ethylene oxide, 1,2-propylene oxide, 1,3-propylene oxide and tetrahydrofuran, unsaturated monomers such as styrene, methylmethacrylate and butadiene, coupling agents such as dimethyl terephthalate and diphenyl carbonate.

As the caprolactone-based polymer (C), a partial hydrogen of methylene chain in the ε-caprolactone unit may be substituted with a halogen atom or hydrocarbon group. Further, the end groups of caprolactone-based polymer may be modified by esterification, etherfication or the like. As the production method of caprolactone-based polymer is not limited. Usually, a method comprising conducting ring-opening polymerization of ε-caprolactone in the presence of suitable initiator such as alcohol, glycol and water and catalyst such as titanium tetrabutoxide and tin chloride is used.

The blending amount of caprolactone-based polymer (C) is 0.01 to 8 parts by weight based on 100 parts by weight of polycarbonate resin. When the blending amount of caprolactone-based polymer (C) is less than 0.01 parts by weight, the preventing effect of coloring may be insufficient. When the blending amount of caprolactone-based polymer (C) is more than 8 parts by weight, the heat resistance, antistatic resistance and transparency may be deteriorated. The blending amount of caprolactone-based polymer (C) is preferably 0.05 to 5 parts, more preferably 0.08 to 4 parts by weight, especially preferably 0.1 to 3 parts by weight based on 100 parts by weight of polycarbonate resin.

In order to prevent coloring at the molding step, the blending ratio of caprolactone-based polymer (C) to the phosphonium sulfonate (A) represented by the chemical formula (1) ((C)/(A), weight ratio) is usually 1/20 to 20/1, preferably 1/10 to 10/1, more preferably 1/8 to 5/1, especially preferably 1/7 to 1/1.

Further, in order to maintain the balance of impact resistance and heat resistance, the blending ratio of aromatic polycarbonate oligomer (B) to the caprolactone-based polymer (C) ((B)/(C), weight ratio) is usually 1/20 to 20/1, preferably 1/10 to 10/1, more preferably 1/8 to 5/1, especially preferably 1/4 to 4/1.

Still further, in order to maintain the balance of impact resistance and heat resistance, the total amount of aromatic polycarbonate oligomer (B) and caprolactone-based polymer (C) ((B)+(C)) is usually 0.11 to 18 parts by weight, preferably 0.1 to 10 parts by weight, more preferably 0.5 to 7 parts by weight, especially preferably 1.0 to 3.0 parts by weight based on 100 parts by weight of polycarbonate resin.

The number average molecular weight of caprolactone-based polymer (C) (measured by GPC) is preferably 1000 to 100000. When the number average molecular weight is less than 1000, the thermal stability may be insufficient. When the number average molecular weight is more than 100000, the processability and transparency may be deteriorated. In view of good transparency, the number average molecular weight of caprolactone-based polymer (C) is more preferably 5000 to 50000, still more preferably 10000 to 30000. When using caprolactone-based polymer (C) having a large molecular weight, the resin composition may be whitened. It is thought that such whitening is caused by a difference of refractive indexes between sea phase and island phase in a sea/island structure formed by dispersing domains comprising caprolactone-based polymer into the matrix. In order to prevent the whitening and improve the transparency, it is preferred to conduct the esterification reaction between the polycarbonate resin and caprolactone-based polymer (C). Therefore, it is preferred that an esterexchange catalyst is blended into the resin composition and the composition is kneaded.

Concrete examples of esterexchange catalyst may include acid materials such as p-toluenesulphonic acid, trifluoroacetic acid, inorganic acids and Lewis acids such as boron trifluoride; metal salts such as acetic acid salt of alkaline metal or alkaline earth metal; and compounds of zinc, manganese, cobalt, antimony, germanium, titanium and tin. Of these, zinc, antimony, titanium and tin compounds are preferred. Concretely, tetraalkyltitanate, zinc acetate, stannous acetate and antimony trioxide are more preferred. Although using no catalyst, there may be a case capable of proceeding the esterexchange reaction. However, in order to proceed the esterexchange reaction more surely, the amount of esterexchange catalyst blended is preferably 0.001 to 0.2 parts by weight based on 100 parts by weight of polycarbonate resin. When the blending amount of esterexchange catalyst is less than 0.001 parts by weight, acceleration effect of esterexchange reaction may be insufficient. When the blending amount of esterexchange catalyst is more than 0.2 parts by weight, coloring of composition may occur. The blending amount of esterexchange catalyst is more preferably 0.005 to 0.1 parts by weight, still more preferably 0.004 to 0.08 parts by weight.

Phosphorus-based Stabilizer (D)

In the present invention, it is preferred to blend a phosphorus-based stabilizer (D) into the polycarbonate resin composition in a specific amount so that the thermal stability can be improved. As the phosphorus-based stabilizer (D), there are exemplified phosphorous acid, phosphoric acid, phosphites, phosphates or the like. Of these, phosphorous acid esters such as phosphites and phosphonites are preferred in view of containing a trivalent phosphorus and being effective for preventing the change of color.

Examples of the above phosphite may include triphenylphosphite, tris(nonylphenyl)phosphite, dilaurylhydrogenphosphite, triethylphosphite, tridecylphosphite, tris(2-ethylhexyl)phosphite, tris(tridecyl)phosphite, tristearylphosphite, diphenylmonodecylphosphite, monophenyldidecylphosphite, diphenylmono(tridecyl)phosphite, tetraphenyl dipropyleneglycol diphosphite, tetraphenyl tetra(tridecyl)pentaerythritol tetraphosphite, hydrogenated bisphenol A phenol phosphite polymer, diphenylhydrogenphosphite, 4,4'-butylydene-bis(3-methyl-6-tert-butylphenyl di(tridecyl)phosphite, tetra(tridecyl)-4,4'-isopropylydene diphenylphosphite, bis(tridecyl)pentaerythritol diphosphite, bis(nonylphenyl)pentaerythritol diphosphite, dilauryl pentaerythritol diphosphite, distearylpentaerythritol diphosphite, tris(4-tert-butylphenyl)phosphite, tris(2,4-di-tert-butylphenyl)phosphite, hydrogenated bisphenol A pentaerythritol phosphite polymer, bis(2,4-di-t-butylphenyl) pentaerythritol phosphite, bis(2,6-di-t-butyl-4-methyl phenyl) pentaerythritol phosphite, 2,2'methylenebis(4,6-di-tert-butylphenyl)octyl phosphite, bis(2,4-di-cumylphenyl) pentaerythritol diphosphite, or the like.

Examples of the above phosphonites may include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, or the like.

Examples of the above acid phosphate may include methyl acid phosphate, ethyl acid phosphate, propyl acid phosphate, isopropyl butyl acid phosphate, butoxy acid phosphate, octyl acid phosphate, 2-ethylhexyl acid phosphate, decyl acid phosphate, lauryl acid phosphate, stearyl acid phosphate, oleyl acid phosphate, behenyl acid phosphate, phenyl acid phosphate, nonyl acid phosphate, cyclohexyl acid phosphate, phenoxyethyl acid phosphate, alkoxy polyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate, bis-nonylphenyl acid phosphate, or the like.

As the phosphorous acid esters in the phosphorus-based stabilizer (D), distearylpentaerythritol diphosphite, tris(2,4-di-tert-butylphenyl)phosphite, bis(2,6-di-t-butyl-4-methyl phenyl) pentaerythritol phosphite, 2,2'methylenebis(4,6-di-tert-butylphenyl)octyl phosphite and bis(2,4-di-cumylphenyl) pentaerythritol diphosphite are preferred. In view of excellent thermal stability and difficult to be hydrolyzed, tris(2,4-di-tert-butylphenyl)phosphite is especially preferred.

Two or more phosphorus-based stabilizer (D) may be blended in mixture. The blending amount of phosphorus-based stabilizer (D) is usually 0.01 to 1.0 parts by weight, preferably 0.03 to 0.5 parts by weight, more preferably 0.05 to 0.2 parts by weight based on 100 parts by weight of polycarbonate resin. When the blending amount of phosphorus-based stabilizer (D) is less than 0.01 parts by weight, the effect of stabilizer may be insufficient so that there is a tendency to reduce the molecular weight during the molding and deteriorate the color hue. When the blending amount of phosphorus-based stabilizer (D) is more than 1.0 part by weight, there is a tendency to generate a silver and deteriorate the color hue more because of excess blending amount.

The blending ratio of phosphorus-based stabilizer (D) to the phosphonium sulfonate (A) represented by the chemical formula (1) ((D)/(A), weight ratio) is usually 0.5/100 to 50/100, preferably 1/100 to 20/100, more preferably 2/100 to 15/100. Further, in order to prevent the thermal deterioration during the molding, the blending ratio of phosphorus-based stabilizer (D) to the aromatic polycarbonate oligomer (B) ((D)/(B), weight ratio) is usually 0.1/100 to 1000/100, preferably 1/100 to 200/100, more preferably 2/100 to 40/100.

Further, in order to prevent the thermal deterioration during the molding, the blending ratio of phosphorus-based stabilizer (D) to the caprolactone-based polymer (C) ((D)/(C), weight ratio) is usually 1/500 to 3/1, preferably 1/100 to 1/1, more preferably 1/15 to 1/3.

Phenol-based Antioxidant (E):

In the present invention, it is preferred to further blend a phenol-based antioxidant (E) in a specific amount so as to improve the preventing effect of deterioration of mechanical strength, transparency and color hue of polycarbonate resin composition. Among the phenol-based antioxidant (E) used in the present invention, it is preferred to use the phenol-based antioxidant having a specific structure represented by the following chemical formula (2) in the molecule so as to prevent the deterioration of color hue and improve the mechanical strength while maintaining the fluidity, transparency and antistatic property.

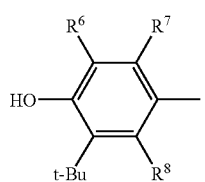

(2)

Where in the chemical formula (2), $R^6$ to $R^8$ are independently hydrogen atom or an alkyl group having a carbon number of 1 to 3 and t-Bu is a tert-butyl group.)

$R^6$ to $R^8$ in the chemical formula (2) are groups which is not bulkier than tert-butyl group and are independently hydrogen atom or an alkyl group having a carbon number of 1 to 3. In the present invention, it is important that the stereo condition around the hydroxyl group is not bulky. Therefore, $R^6$ to $R^8$ are preferably linear alkyl groups, more preferably groups having the carbon number of two or less, still more preferably methyl group or hydrogen atom.

Further, in view of enhancing the antioxidant effect, substituents $R^6$ and/or $R^7$ are preferably hydrogen atom or alkyl group having the carbon number of 1 to 3.

As concrete examples of phenol-based antioxidant having the specific structure represented by the chemical formula (2), there may be mentioned 2,2'-methylenebis(4-methyl-6-tert-butylphenol), 4,4'-butylidenebis(6-tert-butyl-3-methylphenol), 1,1,3-tris(2-methyl-4-hydroxy-5-tert-butylphenyl)butane, 3,9-bis[2-{3-(3-tert-butyl-4-hydroxy-5-methylphenyl)propionyloxy}-1,1-dimethylethyl]-2,4,8,10-tetraoxaspiro[5.5]undecane, triethylene glycolbis[β-(3-tert-butyl-4-hydroxy-5-methylphenyl)propionate], 1,6-hexanediolbis[β-(3-tert-butyl-4-hydroxy-5-methylphenyl)propionate], pentaerithritol-tetrakis[β-(3-tert-butyl-4-hydroxy-5-methylphenyl)propionate], octadecyl[β(3-(3-tert-butyl-4-hydroxy-5-methylphenyl)propionate], or the like.

In view of requirement of heat resistance during the kneading with the polycarbonate, among the above phenol-based antioxidants, 4,4'-butylidenebis(6-tert-butyl-3-methylphenol), 1,1,3-tris(2-methyl-4-hydroxy-5-tert-butylphenyl)butane and 3,9-bis[2-{3-(3-tert-butyl-4-hydroxy-5-methylphenyl)propionyloxy}-1,1-dimethylethyl]-2,4,8,10-tetraoxaspiro[5.5]undecane are preferred. Especially, 1,1,3-tris(2-methyl-4-hydroxy-5-tert-butylphenyl)butane and 3,9-bis[2-{3-(3-tert-butyl-4-hydroxy-5-methylphenyl)propionyloxy}-1,1-dimethylethyl]-2,4,8,10-tetraoxaspiro[5.5]undecane.

Two or more phenol-based antioxidants (E) may be used. The blending amount of phenol-based antioxidants (E) is usually 0.01 to 1.0 parts by weight, preferably. 0.03 to 0.5 parts by weight, more preferably 0.05 to 0.2 parts by weight based on 100 parts by weight of polycarbonate resin. When the blending amount of phenol-based antioxidants (E) is less than 0.01 parts by weight, the effect of antioxidant may be insufficient. When the blending amount of phenol-based antioxidants (E) is more than 1.0 part by weight, there is a tendency to generate a silver streak and deteriorate the color hue because of excess blending amount.

The blending ratio of phenol-based antioxidants (E) to the phosphonium sulfonate (A) represented by the chemical formula (1) ((E)/(A), weight ratio) is usually 0.5/100 to 50/100, preferably 1/100 to 20/100, more preferably 2/100 to 15/100. Further, in order to prevent the thermal deterioration during the molding, the blending ratio of phenol-based antioxidants (E) to the aromatic polycarbonate oligomer (B) ((E)/(B), weight ratio) is usually 0.1/100 to 1000/100, preferably 1/100 to 200/100, more preferably 2/100 to 40/100. Still further, in order to prevent the thermal deterioration during the molding, the blending ratio of phenol-based antioxidants (E) to the caprolactone-based polymer (C) ((E)/(C), weight ratio) is usually 1/100 to 3/1, preferably 1/40 to 1/1, more preferably 1/15 to 1/2.

In the present invention, by blending the phenol-based antioxidants (E) together with the phosphorus-based stabilizer (D) in combination into the resin composition, there can be attained remarkable technical effects in improvement of mechanical strength, transparency and color hue of the polycarbonate resin composition having antistatic property. The blending ratio of phenol-based antioxidants (E) to the phosphorus-based stabilizer (D) ((E)/(D), weight ratio) is 25/100 to 250/100, preferably 50/100 to 200/100, more preferably 75/100 to 125/100.

Weather Resistant Improver (F):

In the present invention, for the purpose of improving the weather resistant of polycarbonate resin composition, it is preferred to further blend a weather resistant improver (F). As the weather resistant improver (F), compounds generally known as UV absorbers and light stabilizers nay be used. As the act of these compounds, there are proposed a mechanism that they absorb light energy of visual light and UV light and convert the light energy to thermal energy; a mechanism that generated precursors are detoxified by photochemistry action.

As the weather resistant improver (F), there may be mentioned various type compounds such as benzophenone-based, benzotriazol-based, salicylic ester-based, benzoate-based, triazine-based, hindered amine-based and cynnamyl-based compounds. These weather resistant improvers may used singly or as a mixture of two or more.

As the benzophenone-based compounds, there may be exemplified 2,4-dihydroxybenzophenone, 2-4-methoxybenzophenone, 2-hydroxy-4-octyloxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, 2-hydroxy-4-methoxybenzophenone-5-sulfonic acid trihydrate and bis(2-hydroxy-3-benzoyl-6-methoxyphenyl)methane.

As the benzotriazol-based compounds there may be exemplified 2-(2-hydroxy-5-methylphenyl)-2H-benzotriazol,2-(2-hydroxy-3,5-di-t-butylphenyl)-2H-benzotriazol, 2-(2-hydroxy-3-t-butyl-5-methylphenyl)-2H-benzotriazol, 2-(2-hydroxy-5-t-octylphenyl)-2H-benzotriazol, 2-(3,5-di-t-octyl-2-hydroxyphenyl)-2H-benzotriazol, 2-(3,5-di-t-amyl-2-hydroxyphenyl)-2H-benzotriazol, 2-(3-lauryl-5-methyl-2-hydroxyphenyl)-2H-benzotriazol, 2-(3,5-di-t-butyl-2-hydroxyphenyl)-5-chloro-2H-benzotriazol,2-(3-t-butyl-5-methyl-2-hydroxyphenyl)-5-chloro-2H-benzotriazol, 2-(3,5-bis(1-methyl-1-phenylethyl)-2-hydroxyphenyl)-2H-benzotriazol, bis(3-(2H-benzotriazol-2-yl)-2-hydroxy-5-methylphenyl)methane, bis(3-(2H-benzotriazol-2-yl)-2-hydroxy-5-(1,1,3,3-tetramethylbutyl)phenyl)methane, bis(3-2H-benzotriazol-2-yl)-2-hydroxy-5-cumylphenyl)methane, bis(3-(2H-benzotriazol-2-yl)-2-hydroxy-5-octylphenyl) methane, 1,1-bis(3-(2H-benzotriazol-2-yl)-2-hydroxy-5-methylphenyl)octane, 1,1-bis(3-(2H-5-chlorobenzotriazol-2-yl)-2-hydroxy-5-methylphenyl)octane, 1,2-ethanediylbis(3-(2H-benzotriazol-2-yl)-2-hydroxybenzoate), 1,12-dodecanediylbis(3-(2H-benzotriazol-2-yl)-4-hydroxybenzoate), 1,3-cyclohexanediylbis(3-(5-chloro-2H-benzotriazol-2-yl)-2-hydroxybenzoate), 1,4-butanediylbis(3-(2H-benzotriazol-2-yl)-4-hydroxy-5- methylethylphenylethanoate), 3,6-dioxa-1,8-octanediylbis (3-(5-methoxy-2H-benzotriazol-2-yl)-4-hydroxyphenyethanoate), 1,6-hexanediylbis(3-(3-(2H-benzotriazol-2-yl)-4-hydroxy-5-t-butylphenyl)propionate), p-xylenediylbis(3-(3-(2H-benzotriazol-2-yl)-4-hydroxyphenyl)propionate), bis(3-(2H-benzotriazol-2-yl)-4-hydroxytoluyl)malonate, bis(2-(3-(2H-benzotriazol-2-yl)-4-hydroxy-5-octylphenyl)ethyl) terephthalate, bis(3-(2H-benzotriazol-2-yl)-4-hydroxy-5-propyltoluyl)octadionate, 2-(2H-benzotriazol-2-yl)-6-phthalimidemethyl-4-methylphenol, 2-(2H-benzotriazol-2-yl)-6-phthalimideethyl-4-methylphenol, 2-(2H-benzotriazol-2-yl)-6-phthalimideoctyl-4-methylphenol, 2-(2H-benzotriazol-2-yl)-6-phthalimidemethyl-4-t-butylphenol, 2-(2H-benzotriazol-2-yl)-6-phthalimidemethyl-4-cumylphenol, 2-(2H-benzotriazol-2-yl)-4,6-bis(phthalimidemethyl)phenol, or the like.

As the salicylic ester-based compounds there may be exemplified phenylsalicylate, 2,4-di-tert-butylphenyl-3,5-do-tert-butyl-4-hydroxybenzoate, or the like.

As the benzoate-based compounds there may be exemplified 2,4-di-tert-butylphenyl-3,5-di-tert-butyl-4-hydroxybenzoate, or the like.

As the triazine-based compounds there may be exemplified 2-(4,6-diphenyl-1,3,5-triazine-2-yl)-5-hexyloxyphenol, or the like.

As the hindered amine-based compounds there may be exemplified bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate, dimethylsuccinate.1-(2-hydroxyethyl)-4-hydroxy-2,2,6,6-tetramethylpiperidine condensation product, poly((6-(1,1,3,3-tetramethylbutyl)amino-1,3,5-triazine-2,4-diyl)((2,2,6,6-tetramethyl-4-piperidyl)imino)hexamethylene((2,2,6,6-tetramethyl-4-piperidyl)imino)),N,N'-bis(3-aminopropyl)ethylenediamine.2,4-bis(N-butyl-N(1,2,2,6,6-pentamethyl-4-piperidyl)amino)-6-chloro-1,3,5-triazine condensation product, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, or the like.

As the other weather resistant improvers, there are exemplified 2-ethoxy-2'-ethyl-oxalic acid bisanilide, ethyl-2-cyano-3,3-diphenylacrylate,2-ethylhexyl-2-cyano-3,3'-diphenylacrylate.

Among the above weather resistant improvers, in view of good compatibility to the polycarbonate resin and being lightly affected to the properties, the benzotriazole-based compounds are preferred. Further, among the benzotriazole-based compounds, 2-(2-hydroxy-5-t-octylphenyl)-2H-benzotriazol, bis(3-(2H-benzotriazol-2-yl)-2-hydroxy-5-(1,1,3,3-tetramethylbutyl)phenyl)methane, bis(3-2H-benzotriazol-2-yl)-2-hydroxy-5-cumylphenyl)methane and 2-(3,5-bis(1-methyl-1-phenylethyl)-2-hydroxyphenyl)-2H-benzotriazol are preferred, and 2-(2-hydroxy-5-t-octylphenyl)-2H-benzotriazol is especially preferred.

The blending amount of weather resistant improver (F) is usually 0.01 to 3.0 parts by weight, preferably 0.03 to 1.0 parts by weight, more preferably 0.1 to 0.8 parts by weight based on 100 parts by weight of polycarbonate resin. When the blending amount of weather resistant improver (F) is less than 0.01 parts by weight, the effect of weather resistant improving may be insufficient. When the blending amount of weather resistant improver (F) is more than 3.0 part by weight, there is a tendency to generate contamination of molding during the injection molding. The above weather resistant improver may be blended thereinto singly or in a mixture of two or more.

The blending ratio of weather resistant improver (F) to the aromatic polycarbonate oligomer (B) ((F)/(B), weight ratio) is usually 0.1/100 to 3000/100, preferably 1/100 to 300/100, more preferably 3/100 to 160/100. The blending ratio of weather resistant improver (F) to the caprolactone-based polymer (C) ((F)/(C), weight ratio) is usually 1/50 to 5/1, preferably 1/20 to 2/1, more preferably 1/10 to 1/1. The blending ratio of weather resistant improver (F) to the phenol-based antioxidants (E) ((F)/(E), weight ratio) is usually 0.1 to 20, preferably 0.5 to 10, more preferably 1.0 to 5.0.

Into the antistatic polycarbonate resin composition according to the present invention, the other additives imparting desired properties therein may be added within the scope of the present invention. As the additives, there may be exemplified the other polymers, flame retardants, impact resistance improvers, plasticizers, mold releasing agents, lubricants, compatibilizers, colorants (pigments such as carbon black and titanium oxide, and dyes such as bluing agents), reinforcing agents or fillers such as glass fibers, glass beads, glass flakes, carbon fiber, fibrous magnesium, potassium titanate whisker, ceramic whiskers, mica, talc, clay and calcium silicate, or the like. These may be blended singly or in a mixture of two or more.

Among the above additives, in order to preventing coloring effectively, it is preferred to blend the bluing agent (G) such as DIARESIN BLUE G manufactured by Mitsubishi Chemical Corporation, preferably anthraquinone-based bluing agents MACROLEX BLUE RR manufactured by Bayer AG, MACROLEX BLUE 3R manufactured by Bayer AG and MACROLEX VIOLET 3R manufactured by Bayer AG.

As the process for producing the polycarbonate resin composition according to the present invention, there may be exemplified a method comprising blending the above mentioned phosphonium sulfonate (A), aromatic polycarbonate resin oligomer (B), caprolactone-based polymer (C) and if required, phosphorus-based stabilizer (D), phenol-based antioxidants (E) and weather resistant improver (F) into the polycarbonate resin at the optional stage before the melt-molding stage to obtain the final molded product by known methods by the skilled person in the art, and kneading it.

As the blending method, there are exemplified a method using a tumbler, Henschel mixer, super mixer or the like, a method of feeding and mixing a quantitative amount of materials by a feeder to an extruder hopper, or the like. As the kneading method, there are exemplified a method using a single-screw extruder and a method using a twin-screw extruder. In order to enhance the dispersibility of antistatic agent therein, the method using a twin-screw extruder is preferred.

Further, since case by case, the phosphonium sulfonate (A) (antistatic agent) used in the present invention is a tenacious liquid at room temperature, it may be added to an extruder by the following methods.

(1) A method comprising warming the phosphonium sulfonate (A) moderately to reduce the viscosity thereof, blending the phosphonium sulfonate (A) with the polycarbonate resin, aromatic polycarbonate resin oligomer, caprolactone-based polymer and the other stabilizers by use of a super mixer to obtain a mixture and feeding the mixture into an extruder.

(2) A method comprising warming the phosphonium sulfonate (A) moderately to reduce the viscosity thereof and feeding the phosphonium sulfonate (A) into an extruder directly by use of a liquid feeding equipment. In this method, the constitutional components other than the phosphonium sulfonate (A) had been prior blended and the blended mixture is kneaded with the liquidfied antistatic agent in the extruder.

(3) A method comprising warming the phosphonium sulfonate (A) moderately to reduce the viscosity thereof and prepare a master agent comprising the phosphonium sulfonate (A) and a part of polycarbonate resin. Thereafter, the remained polycarbonate resin, aromatic polycarbonate resin oligomer, caprolactone-based polymer and the other necessary additives are added into the master agent to obtain a full blended mixture and it is fed into an extruder.

A method of melt-molding using the polycarbonate resin composition according to the present invention to obtain a molded product is not limited and general melt-molding methods used for general thermoplastic resin compositions such as injection molding may be used. In addition, if required, various types injection molding methods such as gas-assist molding, foaming molding, injection blow molding, high-speed injection molding, injection compression molding, insert molding, in-mold coating molding, coinjection molding, sandwiched molding, heat insulation-mold molding, rapid quenching and rapid heating-mold molding, or the like. As the molds used in the above various types injection molding methods, the runner part may comprise a cold runner or hot runner and these runners may be selected for the purpose. Further, as melt-molding methods other than the injection molding, there may be used blow molding, extrusion molding for film or sheet preparation, profile extrusion molding, thermoforming, rotation molding, or the like.

The molded product obtained in the present invention has totally well balanced excellent properties for the transparency, preventing coloring during the melt-kneading and molding steps, fluidity, heat resistance, mechanical strength and antistatic property. Therefore, the molded product according to the present invention is suitably used for substrates and cartridges of recording medium, various parts of electronic & OA equipments, building materials such as transparent sheets and transparent films, parts of miscellaneous goods, parts of pinball machines (covers for circuits, chassis, guides for a pinball, or the like), medical appliances, window glasses, transparent parts for lightings or vehicles such as meter covers, room lamps, taillight lenses, turning signals lamps and head light lenses, further, suitably used for transparent parts for lightings

EXAMPLES

The present invention is described in more detail by Examples. However, it should be noted that the following Examples are only illustrative and not intended to limit the scope of the present invention. In the following Examples and Comparative Examples, all "parts" are by weight unless otherwise noted. The materials used, process for producing the polycarbonate resin composition and molding methods thereof, and evaluation methods of products are shown in the following.

Materials (1) Aromatic Polycarbonate Resin:
"Iupiron® S-1000" produced by Mitsubishi Engineering-Plastics Corporation, viscosity-average molecular weight of 26,000, abbreviated as "PC-1" in the following Tables 1 to 3.

(2) Phosphonium sulfonate: "MEC-100" produced by Takemoto Oil & Fat Co., Ltd, tetrabutyl phosphonium dodecylnebenzene sulfonate, abbreviated as "Antistatic agent A-1" in the following Tables 1 to 3.

(3) Aromatic polycarbonate oligomer: "PC Oligomer AL071" produced by Mitsubishi Engineering-Plastics Corporation, viscosity-average molecular weight of 5,000, abbreviated as "Oligomer B-1" in the following Tables 1 to 3.

(4) Caprolactone-based Polymer:
(C-1) "Placcel HIP" produced by Daicel Chemical Industries, Ltd., number-average molecular weight of 10,000, abbreviated as "C-1" in the following Tables 1 to 3.
(C-2) "Placcel H5" produced by Daicel Chemical Industries, Ltd., number-average molecular weight of 50,000, abbreviated as "C-2" in the following Tables 1 to 3.
(C-3) "Placcel H7" produced by Daicel Chemical Industries, Ltd., number-average molecular weight of 70,000, abbreviated as "C-3" in the following Tables 1 to 3.

(5) Phosphorus-based stabilizer: "ADK STAB 2112" produced by Adeka Corporation, tris(2,4-di-tert-butylphenyl) phosphite, abbreviated as "Phosphorus-based stabilizer D-1" in the following Tables 1 to 3.

(6) Phenol-based antioxidant: "ADK STAB AO-80" produced by Adeka Corporation, 3,9-bis[2-{3-(3-tert-butyl-4-hydroxy-5-methylphenyl)propionyloxy}-1,1-dimethylethyl]-2,4,8,10-tetraoxaspiro[5.5]undecane, abbreviated as "Antioxidant E-1" in the following Tables 1 to 3.

(7) Weather resistant improver: "SEESORB709" produced by Shipro Kasei Kaisha, Ltd., benzotriazol-based UV absorber, 2-(2-hydroxy-5-t-octylphenyl)-2H-benzotriazol, abbreviated as "Weather resistant improver F-1" in the following Tables 1 to 3.

(8) Bluing Agent:
(G-1) MACROLEX BLUE RR produced by LANXESS
(G-2) MACROLEX VIOLET 3R produced by LANXESS
0.00048 parts by weight of the above (G-1) and 0.00048 parts by weight of the above (G-2) were added into the resin compositions in all Examples and Comparative Examples.

Production of Polycarbonate Resin Composition 100 parts by weight of polycarbonate resin produced by the interfacial polycondensation using bisphenol A and phosgene, and prescribed amount shown in Tables 1 to 3 of phosphonium sulfonate (A), aromatic polycarbonate resin oligomer (B), caprolactone-based polymer (C), phosphorus-based stabilizer (D), phenol-based antioxidant (E), weather resistant improver (F) and bluing agent (G) were blended in a blender, and melt-kneaded by a vent-type twin screw extruder to obtain pellets. In the blending, the following blending method was taken because the phosphonium sulfonate (A) was a tenacious liquid at room temperature. Namely, the tenacious liquid of phosphonium sulfonate (A) was warmed to reduce the viscosity, it was added to the polycarbonate resin to obtain a pre-mixture whose phosphonium sulfonate (A) concentration was controlled to 10% by weight by using a supermixer. Thereafter, all materials together with the prepared pre-mixture were mixed in such amount that the mixing ratio is controlled to the component composition shown in Tables 1 to 3 by use of a tumbler blender. As the vent-type twin screw extruder, "TEX30XCT" manufactured by Japan Steel Works, Ltd., (completely intermeshing jaw type, corotaking, double threaded type screw) was used. As the extrusion conditions, the cylinder temperature was 280° C., the extrusion rate was 25 kg/h and the screw revolution was 200 rpm.

Molding the Resin Composition

The above prepared pellets of resin-composition were dried in a circulating hot air oven at 120° for 5 hours, and thereafter were molded to a circular disc (1) (φ100 mm×3.2 mm) and DTUL test specimen (according to the regulation of ASTM D-648) by use of "M150AII-SJ" type injection molding machine manufactured by Meiki Co., Ltd. Under such conditions that the cylinder temperature was 300° C., the mold temperature was 80° C. and molding cycle time was 60 sec. Further, after residence of resin composition in the cylinder of molding machine for 10 minutes, a circular disc (2) was molded and used for test specimens of the color hue measurement.

Evaluation of Molded Products (1) Color Hue:

According to ASTM-E1925, the initial color hue/YI of circular disc (1) having a thickness of 3.2 mm and change of color hue/YI of circular disc before/after the residence molding (namely disc (1) and (2))/ΔYI were measured by use of a color difference meter (SE-2000 type, manufactured by Nippon Denshoku Industries Co., Ltd.). The smaller the ΔYI, the smaller the change of color hue, namely the thermal color hue stability is excellent.

(2) Heat Resistance (Deflection Temperature Under Load):

According to ASTM D-648, the deflection temperature under load (DUTL: ° C.) was measured under load of 1.82 MPa.

(3) Total Light Transmittance

According to ASTM D-1003, the total light transmittance of circular disc (1) having a thickness of 3.2 mm was measured.

(4) Surface Resistance Value

According to ASTM D-257, the surface resistance value of circular disc (1) having a thickness of 3.2 mm was measured.

(5) MFR (Melt Flow Rate)

According to JIS K 7210, the melt flow rate was measured at temperature of 300° C. under load of 1.2 kg.

TABLE 1

|  | Example |  |  |  |  |
|---|---|---|---|---|---|
|  | 1 | 2 | 3 | 4 | 5 |
| PC-1 | 100 | 100 | 100 | 100 | 100 |
| Antistatic agent A-1 | 2 | 2 | 2 | 2 | 2 |
| Oligomer B-1 | 1 | 1 | 1 | 1 | 1 |
| Caprolactone polymer C-1 | 0.5 | 1 | 5 | 7 | — |
| Caprolactone polymer C-2 | — | — | — | — | 0.3 |
| Caprolactone polymer C-3 | — | — | — | — | — |
| Phosphorus-based stabilizer D-1 | 0.1 | 0.1 | 0.1 | 0.1 | 0.1 |
| Antioxidant E-1 | 0.1 | 0.1 | 0.1 | 0.1 | 0.1 |

TABLE 1-continued

|  | Example |  |  |  |  |
|---|---|---|---|---|---|
|  | 1 | 2 | 3 | 4 | 5 |
| Weather resistant improver F-1 | 0.3 | 0.3 | 0.3 | 0.3 | 0.3 |
| <Evaluation> Color hue | | | | | |
| Initial color hue (YI) | 0.6 | 0.6 | 0.6 | 0.6 | 0.6 |
| Change of color hue before/after residence molding (ΔYI) | 1.0 | 0.8 | 0.4 | 0.3 | 1.3 |
| Heat resistance (DTUL: ° C.) | 125 | 123 | 118 | 112 | 126 |
| Total light transmittance (%) | 89 | 89 | 89 | 88 | 89 |
| Surface resistivity (Ω) | $2 \times 10^{13}$ | $2 \times 10^{13}$ | $2 \times 10^{13}$ | $3 \times 10^{13}$ | $2 \times 10^{13}$ |
| MFR (g/10 min) | 21 | 23 | 31 | 35 | 20 |

TABLE 2

|  | Example |  |  |  |  |
|---|---|---|---|---|---|
|  | 6 | 7 | 8 | 9 | 10 |
| PC-1 | 100 | 100 | 100 | 100 | 100 |
| Antistatic agent A-1 | 2 | 2 | 2 | 2 | 2 |
| Oligomer B-1 | 1 | 1 | 1 | 1 | 1 |
| Caprolactone polymer C-1 | — | — | — | — | — |
| Caprolactone polymer C-2 | 0.5 | 1 | — | — | — |
| Caprolactone polymer C-3 | — | — | 0.3 | 0.5 | 1 |
| Phosphorus-based stabilizer D-1 | 0.1 | 0.1 | 0.1 | 0.1 | 0.1 |
| Antioxidant E-1 | 0.1 | 0.1 | 0.1 | 0.1 | 0.1 |
| Weather resistant improver F-1 | 0.3 | 0.3 | 0.3 | 0.3 | 0.3 |
| <Evaluation> Color hue | | | | | |
| Initial color hue (YI) | 0.6 | 0.6 | 0.6 | 0.6 | 0.6 |
| Change of color hue before/after residence molding (ΔYI) | 1.1 | 0.9 | 1.3 | 1.2 | 1.0 |
| Heat resistance (DTUL: ° C.) | 126 | 125 | 126 | 126 | 125 |
| Total light transmittance (%) | 89 | 89 | 89 | 88 | 89 |
| Surface resistivity (Ω) | $2 \times 10^{13}$ | $2 \times 10^{13}$ | $2 \times 10^{13}$ | $2 \times 10^{13}$ | $2 \times 10^{13}$ |
| MFR (g/10 min) | 21 | 22 | 20 | 20 | 21 |

TABLE 3

|  | Comparative Example |  |  |  |  |  |  |
|---|---|---|---|---|---|---|---|
|  | 1 | 2 | 3 | 4 | 5 | 6 | 7 |
| PC-1 | 100 | 100 | 100 | 100 | 100 | 100 | 100 |
| Antistatic agent A-1 | 2 | 2 | 2 | 2 | 2 | 2 | 2 |
| Oligomer B-1 | 1 | 1 | 1 | 1 | — | — | — |
| Caprolactone polymer C-1 | — | 10 | — | — | 1 | — | — |
| Caprolactone polymer C-2 | — | — | 10 | — | — | 1 | — |
| Caprolactone polymer C-3 | — | — | — | 10 | — | — | 1 |

TABLE 3-continued

|  | Comparative Example | | | | | | |
|---|---|---|---|---|---|---|---|
|  | 1 | 2 | 3 | 4 | 5 | 6 | 7 |
| Phosphorus-based stabilizer D-1 | 0.1 | 0.1 | 0.1 | 0.1 | 0.1 | 0.1 | 0.1 |
| Antioxidant E-1 | 0.1 | 0.1 | 0.1 | 0.1 | 0.1 | 0.1 | 0.1 |
| Weather resistant improver F-1 | 0.3 | 0.3 | 0.3 | 0.3 | 0.3 | 0.3 | 0.3 |
| <Evaluation> | | | | | | | |
| Color hue | | | | | | | |
| Initial color hue (YI) | 0.6 | 0.6 | 0.6 | 0.6 | 0.6 | 0.6 | 0.6 |
| Change of color hue before/after residence molding (ΔYI) | 2.2 | 0.3 | 0.3 | 0.3 | 0.8 | 0.9 | 1.0 |
| Heat resistance (DTUL: ° C.) | 127 | 107 | 108 | 108 | 125 | 125 | 125 |
| Total light transmittance (%) | 89 | 87 | 86 | 86 | 89 | 89 | 89 |
| Surface resistivity (Ω) | $2 \times 10^{13}$ | $5 \times 10^{13}$ | $5 \times 10^{13}$ | $5 \times 10^{13}$ | $2 \times 10^{13}$ | $2 \times 10^{13}$ | $2 \times 10^{13}$ |
| MFR (g/10 min) | 20 | 40 | 39 | 37 | 18 | 18 | 17 |

(1) Comparing with Examples and Comparative Example 1, it can be understood that by blending the caprolactone-based polymer, the change of color hue before/after residence molding can be prevented and be reduced to small while maintaining the excellent heat resistance, transparency, antistatic property and fluidity.

(2) Comparing with Examples and Comparative Examples 2 to 4, it can be understood that by blending the caprolactone-based polymer in the amount of 8 parts or less by weight, totally well balanced properties in all properties of color hue before/after residence molding, heat resistance, transparency and antistatic property can be attained.

(3) Comparing with Examples 2, 7 and 10, and Comparative Examples 5 to 7, it can be understood that by the aromatic polycarbonate oligomer, 20 g/10 min of MFR can be attained, and totally well balanced properties in MFR as well as the other properties can be attained.

The invention claimed is:

1. A transparent polycarbonate resin composition comprising
100 parts by weight of polycarbonate resin,
0.1 to 5.0 parts by weight of phosphonium sulfonate (A) represented by the following chemical formula (1),
0.5 to 1 parts by weight of aromatic polycarbonate resin oligomer (B) and
0.01 to 8 parts by weight of caprolactone-based polymer (C)

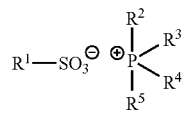

(1)

(where in the chemical formula (1), $R^1$ is an alkyl group or aryl group having a carbon number of 1 to 40, which may have substituent group(s) and $R^2$ to $R^5$ are independently hydrogen atom, or an alkyl group or aryl group having a carbon number of 1 to 10 wherein each $R^2$ to $R^5$ may be same group or different group.)

2. A transparent polycarbonate resin composition according to claim 1, wherein the total blending amount of aromatic polycarbonate resin oligomer (B) and caprolactone-based polymer (C) based on 100 parts by weight of polycarbonate resin (B+C) is 1.0 to 7 parts by weight.

3. A transparent polycarbonate resin composition according to claim 1, further comprising a phosphorus-based stabilizer (D) in an amount of 0.01 to 1.0 parts by weight based on 100 parts by weight of polycarbonate resin.

4. A transparent polycarbonate resin composition according to claim 1, further comprising a phenol-based antioxidant (E) having a structure in the molecule represented by the following chemical formula (2) in an amount of 0.01 to 1.0 parts by weight based on 100 parts by weight of polycarbonate resin.

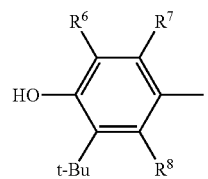

(2)

(where in the chemical formula (2), $R^6$ to $R^8$ are independently hydrogen atom or an alkyl group having a carbon number of 1 to 3 and t-Bu is a tert-butyl group.)

5. A transparent polycarbonate resin composition according to claim 1, further comprising a weather resistant improver (F) in an amount of 0.01 to 3.0 parts by weight based on 100 parts by weight of polycarbonate resin.

6. A transparent molded product produced by melt-molding the polycarbonate resin composition according to claim 1.

* * * * *